July 24, 1956
T. C. RUSCONI
2,755,721
AUTOMATIC DEPTH CONTROL SYSTEMS FOR
AGRICULTURAL IMPLEMENTS
Filed June 22, 1951
2 Sheets-Sheet 1
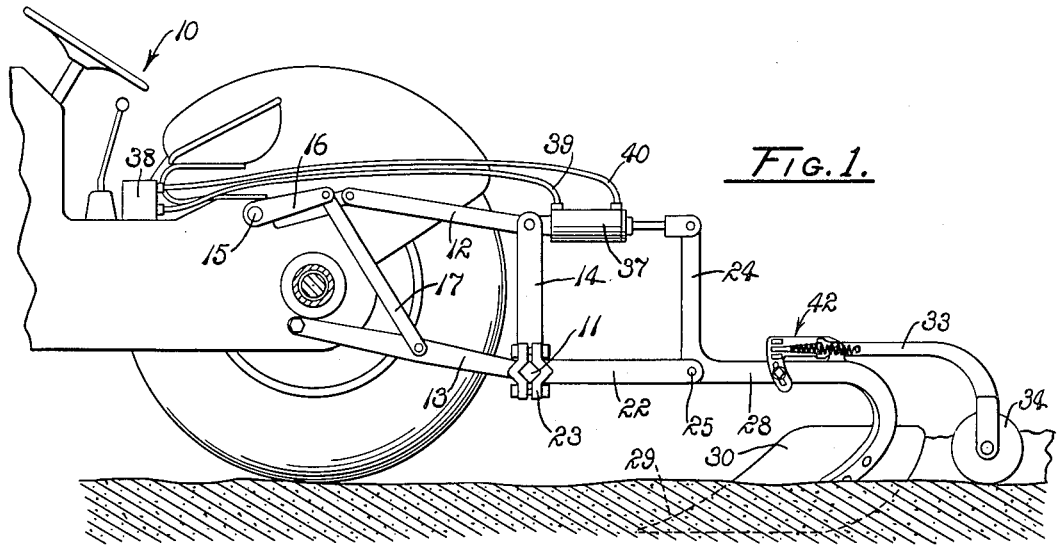
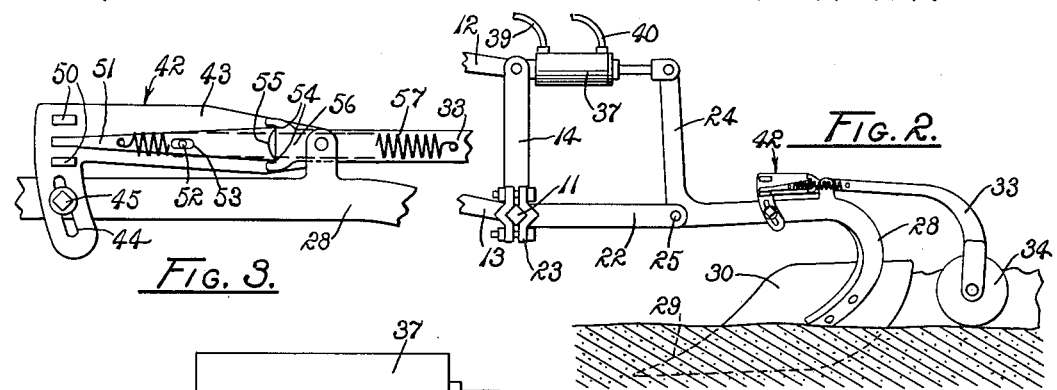
THEODORE C. RUSCONI
INVENTOR
HUEBNER, BEEHLER,
WORREL & HERZIG
ATTORNEYS
BY Richard M. Worrel July 24, 1956

T. C. RUSCONI 2,755,721

AUTOMATIC DEPTH CONTROL SYSTEMS FOR
AGRICULTURAL IMPLEMENTS

Filed June 22, 1951

THEODORE C. RUSCONI
INVENTOR

HUEBNER, BEEHLER,
WORREL & HERZIG
ATTORNEYS

BY Richard M. Worrel

United States Patent Office 2,755,721
Patented July 24, 1956

2,755,721

AUTOMATIC DEPTH CONTROL SYSTEMS FOR AGRICULTURAL IMPLEMENTS

Theodore C. Rusconi, Sanger, Calif.

Application June 22, 1951, Serial No. 233,028

5 Claims. (Cl. 97—46.81)

The present invention relates to automatic control systems and more particularly to such a system for agricultural implements operable in connection with a draft appliance having a draft hitch to which an earth-working tool is connected, including means for raising and lowering the tool relative to the draft appliance, the system being effective in automatically compensating for tendencies of the tool to increase or decrease its depth of earth engagement during operation.

The subject invention relates generally to the subject matter of my copending United States patent application filed July 15, 1949, Serial No. 104,874, now Patent No. 2,629,306, entitled "Hydraulic Control System" but is distinguished therefrom in objectives achieved and structures employed.

Tractors providing elevationally positionable tool bars for mounting earth-working tools have become popular in those operational environments in which the earth working requirements are not excessively heavy and the tools employed can be conveniently carried by the tractor. For example, it is well known to mount plows, cultivators, disk harrows, seeders, choppers, and the like directly on such elevationally positionable tool bars. Although such mounting has proved a great improvement over prior practices, it is subject to certain difficulties which the present invention seeks to overcome.

Such tool bars are usually elevationally positioned by a hydraulic ram. The operational height of the tool bar is selected by adjustment of the ram in preparation for operation. No matter how meticulous the adjustment of such rams, varied soil characteristics, varied moisture content, roots and other obstacles in the soil, uneven terrain, and the like cause earth-working tools borne by such tool bars to engage the earth to various depths. This is particularly true of plows which are well known to vary widely in depth of earth engagement as a result of even relatively minor variations in soil conditions and types encountered.

It has been discovered that leakages in control systems for such rams frequently permit excessive departures from predetermined adjusted position, excessive tolerances in the rams or other portions of the control systems therefore permit elevational creeping, and flexibilities in the draft hitches are such that uniform depth of earth engagement cannot be assured without continuous readjustment. It is the usual practice for the operator of a tractor having such a tool bar either to tolerate variations in depth of earth engagement by tools borne thereby or continuously to readjust the hydraulically controlled systems to compensate for undesirable variations. Obviously, the continuous readjustment of the systems is a nuisance and subject to human error as well as laxity in careful and continuous observation of tool-operation. The subject invention is concerned with the automatic readjustment of depth of earth engagement incident to continuous detection of such depth of earth engagement of an earth-working tool.

Another object of the present invention is to provide an improved automatic control system operable automatically to compensate for departures of earth-working tools mounted on elevationally controlled tractor hitches from desired depth of earth engagement.

Another object is to provide means for detecting the depth of earth engagement of an earth-working tool during earth traversing motivation thereof.

Other objects are to provide an improved cultivation depth detecting means operable in connection with an earth-working tool and a system responsive to elevational movement of such an earth-working tool relative to the detection means adapted promptly to compensate for such relative movement beyond predetermined tolerances.

Another object is to provide improved elements and arrangements thereof in devices of the character and for the purposes set forth that are economical to produce, dependable in operation, and fully effective in accomplishing the intended purposes.

Further objects and advantages will become apparent in the subsequent description in the specification.

In the drawings:

Fig. 1 is a fragmentary side elevation of a conventional tractor, having a rear wheel thereof removed for illustrative convenience, shown in supporting and motivating coupled relation to a first form of the present invention.

Fig. 2 is a fragmentary side elevation of the device of the present invention shown in Fig. 1 illustrating automatic compensation for variations in depth of soil engagement by an earth-working tool.

Fig. 3 is an enlarged elevation of a reversible snap switch employable in an embodiment of the present invention shown in association with fragmentarily illustrated cooperative structure.

Fig. 5 is a diagrammatic representation of the automatic control system of the present invention including an enlarged longitudinal section of a valve structure illustrative of a suitable form for the system, said valve being shown in a locking-operating position.

Figure 6:
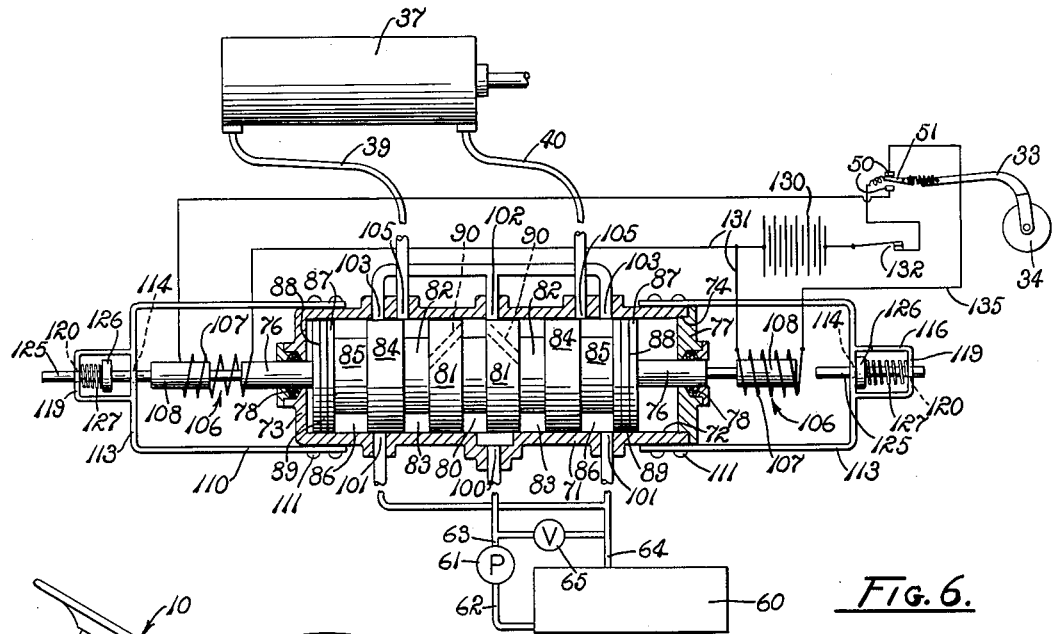
Fig. 6 is a diagrammatic representation of the system similar to Fig. 5 but showing the valve in a position adapted to decrease the depth of earth engagement of an earth-working tool.

Brief attention is preliminarily devoted to certain portions of the drawings regarded as representative of conventional structure. In Figs. 1 and 6 a conventional tractor is fragmentarily shown at 10 representative of draft appliances and support vehicles generally with which the device of the present invention is adapted to be used. The tractor provides an elevationally positionable tool bar 11 transversely disposed to the normal direction of movement of the tractor. Mounting arms 12 and 13 are pivotally mounted on the tractor and rearwardly extended therefrom in approximately parallel relation. An A-frame 14 is mounted on the rearwardly extended ends of the mounting arms in a substantially erect position.

Several commercial forms of tractors provide hydraulically positioned rock shafts of the form shown at 15 in Fig. 1. Elevating and depressing arms 16 are rigidly extended radially from such rock shafts and a telescopically adjustable push-pull rod 17 connected between the extended end of each of the arms 16 and a corresponding lower mounting arm 13.

By controlled positioning of the rock shaft 15, it will be seen that the A-frame 14 and the tool bar 11 may be raised and lowered elevationally to position any implement connected thereto. It will also be observed that during elevational movement the A-frame maintains a substantially erect position. Unfortunately, once the A-frame and tool bar are positioned at a desired elevation, there is no assurance that the A-frame and tool bar will not be elevationally displaced by forces imposed thereon during operation. The causes for such displacement have previously been briefly alluded to. It also should be observed that the A-frame and tool bar can be released for free floating movement.

Figure 4:
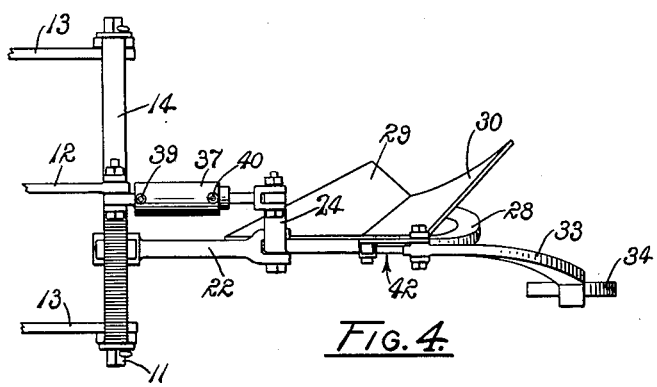
Fig. 4 is a plan view of the structure shown in Fig. 2.

As indicated in Figs. 1, 2 and 4, in the first form of the present invention, a rigid beam 22 is clamped on the tool bar 11, as at 23, and rearwardly extended horizontally therefrom. The rearwardly extended end of the beam is preferably bifurcated to receive a control lever 24 therein in a substantially erect position. The control lever is pivotally mounted, as by a pin 25, passed through the bifurcated end of the beam and a lower end of the lever.

A plow beam 28 is rearwardly extended from the lower end of the control lever 24 and may conveniently be an integral portion thereof. The plow beam is rearwardly extended and thence arcuately downwardly, as is well known in plows, to mount a plow-share 29 and moldboard 30. While the plow beam 28, share 29 and moldboard 30 are a form of earth-working tool illustrated and described, it will be clearly apparent that they simply exemplify various forms of earth-working tools and mountings therefor with which the device of the present invention may be employed. To attain the full advantages of the present invention, however, the tool should be of such a character, as exemplified by the plow, which when tipped forwardly tends to dig in more deeply and when tipped rearwardly tends to emerge from the soil during forward movement.

A control arm 33 is pivotally mounted on the plow beam 28 for elevational movement and rearwardly extended therefrom. A depth detection wheel 34 is rotatably mounted on the rearwardly extended end portion of the control arm in ground engagement adjacent to the plow. When the present invention is utilized with a plow or other implement which forms a furrow, the wheel rides alongside of the furrow formed thereby. When a non-furrow forming earth-working tool is employed, the wheel may ride rearwardly thereof on worked earth and still accomplish the desired detection. It will be observed that the present invention is not limited to the employment of any particular form of wheel or other depth detecting member, the employment of any suitable form thereof such as a skid, runner, or the like being considered to be within the scope of the described invention.

A reversible telescopic motor element, such as a two-way ram 37, is pivotally connected between the upwardly extended end of the control lever 24 and the A-frame 14. There are many well known telescopically adjustable rams commercially available and the details of structure thereof not herein described. A controllable source of hydraulic fluid under pressure is indicated at 38 in Fig. 1. A pair of conduits 39 and 40 interconnect the controllable source 38 and opposite ends of the ram 37. To extend the ram, hydraulic fluid under pressure is directed through the conduit 39 thereto and fluid from the opposite end of the ram bled back therefrom through the conduit 40. To contract the ram, hydraulic fluid under pressure is directed to the ram through the conduit 40 and fluid from the opposite end of the ram bled therefrom through the conduit 39.

A single pole double throw electric switch 42 is provided on the beam 22 adjacent to the control arm 33. Although the switch may take several forms, a suitable structure, as shown in Fig. 3, consists of a plate 43 of dielectric material mounted in an erect position in a plane parallel to the plane of vertical movement of the control arm. The plate preferably has one end pivotally mounted on the plow beam 28 and an opposite end providing an elongated arcuate slot 44 concentric to the pivotal mounting of the plate. A headed adjustment bolt 45 is extended through the slot 44 and screw-threadably engaged in the plow beam 28 to provide dependable locking in adjusted position.

The switch plate 43 has a pair of electrical contacts 50 mounted thereon in spaced relation and a contact engaging blade 51 pivotally mounted on the plate as by a headed pin 52 extended through a longitudinal slot 53 formed in the blade. As will subsequently become apparent, the blade has a neutral position intermediate the contacts, as shown in Fig. 5, and is movable to engagement individually with the contacts. The pivot pin 52 also may serve as an electrical contact with the blade. The blade provides an end opposite from the end thereof engageable with the contacts 50 having spaced alternately employed fulcrum points 54 in substantially equally spaced relation to the pivot pin 52 and having a concave portion 55 therebetween. The control arm 33 is forwardly extended from its pivotal mounting on the plow beam 28 and a bracket 56 provided thereon in spanning relation to the fulcrum points 54. The bracket is forwardly extended on opposite sides of the fulcrum points 54 in loose engagement with the blade. A tension member, such as a spring 57 is connected between the control arm 33 rearwardly of the pivotal mounting thereof and to the blade 51 forwardly of its pivotal mounting.

The tension spring 57 urges both of the fulcrum points 54 into engagement with the bracket 56 of the control arm 33 as long as the forward end of the control arm is aligned with the pivot pin 52 or only slightly displaced from alignment, and thus has a tendency to position the blade in right angular relation to the surface of the bracket on which the fulcrum points rest. When the rearward end of the control arm descends a distance sufficient that the line of pull exerted by the spring 57 on the blade 51 passes the lowermost fulcrum point, it will be evident that the blade is snapped into engagement with the lowermost of the contacts 50. When the rearward end portion of the control arm 33 raises a distance sufficient to cause the line of tension of the spring 57 to pass upwardly beyond the uppermost fulcrum point 54, the blade is snapped upwardly into engagement with the uppermost of the contacts 50. It will be of course obvious that other types of electrical switches may be employed in the device of the present invention, that described serving to exemplify a suitable form which is excellently suited to the purpose.

The source 38 of hydraulic fluid under pressure shown in Fig. 1, contains certain elements illustrated in some detail in Figs. 5 and 6. A reservoir 60 for hydraulic fluid is provided on the tractor and a fluid pump 61 connected thereto by an intake line 62. The pump has a discharge line 63 extended therefrom. A return conduit 64 is also connected to the reservoir and makes provision for the return flow of ram actuating fluid to the reservoir. A bypass valve 65 interconnects the discharge line 63 of the pump with the return conduit 64 so that any excessive pressures built up by the pump during operation of the device of the present invention are dissipated through the valve 65 back to the reservoir.

The pump discharge line 63 and the return conduit 64 are connected to a master control valve indicated generally at 70 in Figs. 5 and 6, which control valve is also connected to the conduits 39 and 40 whereby fluid under pressure from the pump 61 may be directed to selected ends of the ram 37 and fluid from the opposite end thereof bled back to the reservoir 60. The valve consists of a housing 71 having a cylindrical inner bore 72, a closed end portion 73, and a threaded opposite end portion 74. A core 75 is slidably fitted to the core 72 in substantially fluid-tight engagement therewith. For controlled positioning of the core 75, control rods 76 are axially and concentrically extended from the core to positions exteriorly of the housing. One of the control rods 76 is slidably extended through the closed end portion 73 and the opposite control rod 66 slidably mounted in a bushing 77 screw-threadably engaged in the opening 74 in closing relation to the housing. It will be apparent that axial movement of either of the control rods 76 from externally of the housing 71 results in responsive positioning of the core 75 within the housing. Packing glands 78 are provided in securing relation to each of the control rods and serve to preclude leaking of fluid from the housing. The closed end portion 73 of the housing and the bushing 77 may be ported if desired so that opposite ends of the core 75 are exposed to atmospheric pressure or may remain closed, as shown, so that air trapped within the housing at opposite ends of the core provides a resilient pneumatic cushion against which core operation is effected and which tends to centralize the core in the absence of displacing forces exerted thereon.

The core 75 is shaped to provide a plurality of adjacent, axially aligned, concentric portions conveniently formed from a single cylindrical core stock member. Alternate portions are slidably fitted to the housing 71 and the intermediate portions are of reduced diameter providing circular fluid passages about the peripheries thereof within the housing 71. A central portion of reduced diameter is provided in the core to define a circumscribing high pressure passage 80 about the core within the housing. Opposite sides of the passage are formed by a pair of spaced primary gates 81 slidably fitted to the housing. Axially adjacent to the gates 81 are portions of reduced diameter 82 providing circumscribing control passages 83 having outer walls formed by enlarged cylindrical portions 84, referred to as secondary gates, slidably fitted to the housing. Portions of reduced diameter 85 endwardly adjacent to the secondary gates 84 provide circumscribing fluid return passages 86 thereabout limited axially of the core by cylindrical fluid retaining flanges 87 slidably fitted to the housing. The flanges 87 each have a peripherally disposed circumscribing groove 88 which receives packing 89 to preclude leaking of hydraulic fluid within the housing axially of the portions 87. The control passages 83 are connected in fluid communication with the high pressure passage 80 by bores 90 formed through the primary gates 81.

A supply port 100 is provided intermediate the end portions of the housing 71 for registration with the high pressure passage 80 in the core 75. The supply port is of a size and shape sufficient continually to register with the high pressure passage 80 during all longitudinal reciprocation of the core in the housing. The port 100 is connected to the discharge line 63 of the pump 61. A pair of fluid return ports 101 are provided in the housing in opposite spaced relation to the port 100 longitudinally of the housing and arranged to register with the return passages 86 when the core is in central position. Each of the return ports 101 are connected to the return conduit 64. An exhaust port 102 is provided in the housing 61 in alignment transversely from the supply port 100. A pair of return ports 103 are provided in the housing in transverse alignment with the ports 101. A bypass conduit 104 interconnects the exhaust port 102 and both of the return ports 103. Intermediate the exhaust port 102 and each of the return ports 103, control ports 105 are provided in the housing in positions blocked by the secondary gates 84 when the core is in central position, as shown in Fig. 5. One of the control ports is connected to the conduit 39 and the other control port to the conduit 40.

A solenoid 106 is provided for each of the control rods 76 and each consists of a coil 107 provided in the well known manner about a core 108 connected in axial alignment, as by screw-threaded engagement, with a respective control rod. The coils are electrically connected so that the solenoids have opposing effects on the core when electrically energized.

A mounting frame 110 is extended axially from the housing 71 in enclosing relation to the solenoids 106 and rigidly mounted on the housing, as at 111. The frames each have end portions 113 in axial alignment with the core 75, control rods 76, and solenoid cores 108 and end bores 114 are formed therethrough in concentric alignment with said elements. A secondary frame 116 is mounted on each of the frames 110 and endwardly extended therefrom so as to provide secondary end portions 119 in spaced relation to the end portions 113 in which provision is made for bores 120 in axial alignment with the bores 114.

A stop rod 125 is slidably mounted in each of the adjacent bores 104 and 109 and provides a circumscribing flange, or collet, 126 fixedly mounted thereon. Springs 127 are located under initial compression between the flanges 126 and the end portions 119 so that the stop rods in abutment with the solenoid cores 108 resiliently resist endward movement of the valve core 108 theretoward. It is significant that the stop rods are not connected to the solenoids but only abut the same. The flanges 126 are arranged so that they limit travel of their respective stop rods 125 toward the valve core 108 by engagement with the end portions 113.

A battery 130 is mounted on the tractor 10 and provides a convenient source of electrical energy for selective energizing of the coils 107 of the solenoids 106. One of the inner ends of each of the coils 107 is connected by a lead wire 131 to one side of the battery 130. The opposite pole of the battery is connected through a manually operable switch 132 to the pivot pin 52 of the blade 51 of the switch 42 by means of a conductor 133. The outer end of one of the coils 107 is connected by a wire 134 to one of the contacts 50 and the other coil connected to the opposite contact 50 by a wire 135. The manually operated switch 132 provides means for interrupting the electrical circuits just described so that the core 75 remains in its centered position under the influence of the springs 127. As previously explained, the solenoid coils 107 are arranged to have opposite positioning effects on the core 75 for displacement thereof from the central position when the switch 132 is closed upon engagement of one of the contacts 50 by the blade 51 incident to elevational movement of the control arm 33 relative to the share 29 of the plow.

*Operation*

The operation of the system of the present invention is believed to be clearly apparent and is briefly summarized at this point. The tractor 10 is driven on a path of earth traversing movement along which it is desired to work the soil and the rock shaft 15 manipulated in the conventional manner to lower the plow or other earth working tool employed into earth engagement. Instead of endeavoring to maintain the tool bar 11 at a fixed elevation, or at a minimum depth as conventionally attempted, the bar is released by the conventional hydraulic control system of the tractor for free floating movement after which the automatically controlled attitude or inclination of the plow is relied upon to control the depth of earth engagement. When the plow or other tool descends into increased depth of earth engagement, the plow beam 28 and switch 42 mounted thereon descends relative to the wheel 34 riding at soil surface level. If the variation in relative heights of the plow and wheel are small, the snap operation of the switch will not occur but if the descent of the plow is in excess of the predetermined triggering extent of such relative movement, the blade 51 will be snapped into engagement with the upper contact 50. The solenoid at the right of Figs. 5 and 6 is energized thereby to draw the core 75 to the left as shown in Fig. 5 directing hydraulic fluid from the pump under pressure to the conduit 39 to expand the ram 37 while bleeding the opposite end of the ram back through the conduit 40 and valve 70 to the reservoir 60. Expansion of the ram results in the movement of the upper end of the control lever 24 rearwardly and the pointing of the forward end portion of the plowshare 29 upwardly so that the plow, through its earth engagement, tends to ride upwardly as it moves through soil. The upward movement of the plow continues until the relative heights of the plow and the wheel 34 are such that the blade 51 is returned to its neutral position by the spring 57. As an incident to the upward movement of the plow, the rigid arm 22 carries the tool bar 11 upwardly in its free floating movement.

If the plow raises beyond the predetermined triggering amount relative to the wheel 34, the blade 51 is snapped into engagement with the lower contact 50 and the solenoid 106, illustrated at the left of Figs. 5 and 6, is energized to supply hydraulic fluid under pressure through the conduit 40 while bleeding the ram through the conduit 39 effectively contracting the ram and lowering the forward end portion of the plow for increased earth engagement incident to the increased digging effect of its forwardly tipped attitude.

Second form

Figure 7:
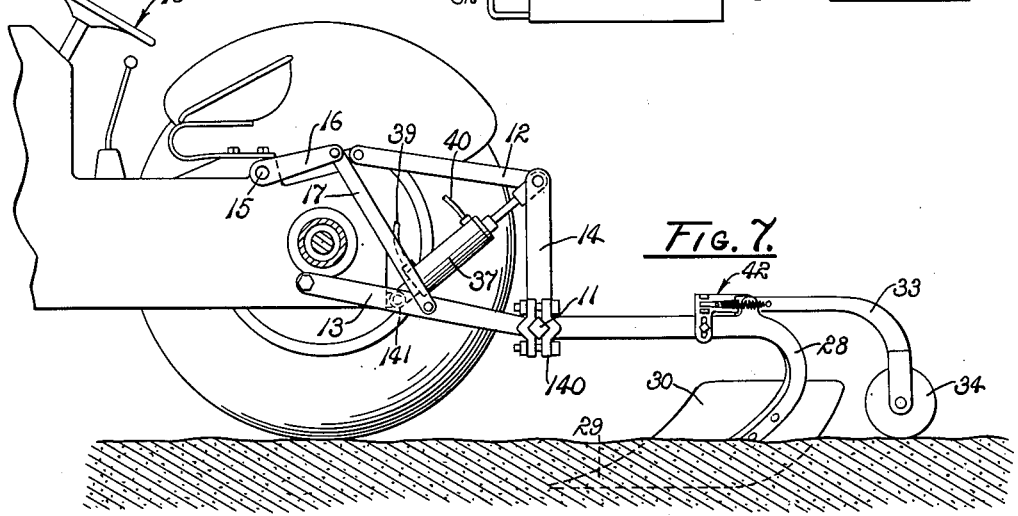
Fig. 7 is a fragmentary side elevation of a tractor with a rear wheel removed for illustrative convenience and showing a second form of the present invention coupled thereto for support and earth-traversing movement.

A second form of the present invention is shown in Fig. 7 which is identical in several particulars. Elements of the second form that are substantially the same as the corresponding elements of the first form are given the same identifying numerals for descriptive convenience. The plow beam 28 is rigidly mounted on the tool bar 11 as by clamps 140 and possesses no control lever of the type described in the first form. The rigid mounting maintains the plow in predetermined earth engaging attitude, as preferred by some farmers, in contrast with the first form of the invention. Provision is made for forcibly raising and lowering the plow automatically in response to detection of depth of earth engagement by the wheel 34 by mounting the ram 37 pivotally between a coupling bracket 141 attached to the tractor 10 and the upper portion of the A-frame 14. As in the first form, the arms 16 are released for free pivotal movement during operation of the second form of the invention.

The same electrical circuit and hydraulic system, including the control valve 70 and ram connection shown in Figs. 5 and 6 are utilized.

When the plow 29—30 descends relative to the wheel 34 in excess of the predetermined triggering extent, as shown in dashed line in Fig. 7, the switch 42 is operated as before to energize the left solenoid 106, shown in Figs. 5 and 6, resulting in the expansion of the ram 37. The position of the ram 37 assures that the A-frame 14 and thus, the tool bar 11 will be raised incident to ram extension and because of the rigid mounting of the plow beam 28 on the tool bar the plow is forcibly elevated. The converse is true when the plow raises relative to the wheel 34 in excess of the predetermined triggering extent of relative movement.

In the second form of the invention, the conventional system for selectively raising the tool bar by controlled positioning of the rock shaft 15 is usually employed when it is desired to withdraw the plow from the earth as for transporting purposes. When the manually controlled switch 132 is opened the system of the present invention is rendered inoperable and any auxiliary means desired may be utilized to effect operator-controlled elevational positioning of the earth-working tool. It will be apparent that by pivotally positioning the switch plate 43 the normal relative depths of earth engagement of the wheel 34 and plowshare 29 can be determined. If it is desirable for the wheel 34 to ride lower relative to the plow before triggering action, the plate 43 is pivoted in a counter-clockwise direction, as viewed in the drawings, to the required extent to compensate for the desired difference of earth engagement. To raise the neutral position of the wheel relative to the plow, the plate is pivoted in a counter-clockwise direction, as viewed.

The systems of the present invention are economical to produce, easy to install, fully effective in accomplishing their intended functions, and successfully solve the described problems incident to automatic depth control.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent systems and apparatus.

Having described my invention, what I claim as new and desire to secure by Letters Patent is:

1. In a draft appliance, an elevationally movable draft hitch supported on the appliance, an earth-working tool borne by the draft hitch in earth engagement, a control arm mounted on the earth-working tool for pivotal elevational movement and rearwardly extended therefrom, the control arm having a bifurcated forward end means borne by the rearwardly extended end of the control arm in earth engagement adjacent to the earth-working tool, an hydraulic ram connected to the draft hitch, an hydraulic system connected to the ram including a reversible valve whereby the ram may be adjustably contracted and extended, a switch including a plate pivotally mounted on the tool coaxially of the control arm and forwardly extended from its mounting, means for constraining the plate to adjusted pivotal position on the tool, a pair of electrical contacts mounted in spaced relation on the plate eccentrically of its pivotal mounting, a switch blade pivotally mounted on the plate having an end rearwardly extended from its pivotal mounting operatively engaged in the bifurcated forward end of the control arm and an end forwardly extended from said pivotal mounting of the blade disposed between the contacts for selective engagement therewith, and tension means interconnecting the blade at a position forwardly of its pivotal mounting and the control arm at a position rearwardly of its pivotal mounting, and an electrical system including a source of electrical energy connecting the switch blade to the source of electrical energy and the switch contacts individually to the reversible valve whereby engagement of one of the contacts by the blade operates the valve to extend the ram and engagement of the other contact by the blade reverses the valve to contract the ram.

2. An automatic control system for an earth-working tool carried in earth-traversing movement by a motivating vehicle having a predetermined relative direction of movement comprising a draft hitch borne by the vehicle, a plow mounted in following relation on the tool bar having a forwardly extended plow beam pivotally connected to the tool bar for pivotal elevational movement of the plow, a control lever rigidly mounted on the plow beam and upwardly extended therefrom adjacent to the draft hitch, a two-way ram pivotally interconnecting the control lever and the draft hitch, a control arm having a forward end portion pivotally mounted on the plow beam and an opposite end portion rearwardly extended therefrom, a wheel rotatably mounted on the rearwardly extended end of the control arm for ground engagement adjacent to the plow, a single pole double throw switch having a pair of contacts, a plate mounting the pair of contacts in insulated spaced relation thereon, means pivotally mounting the plate on the plow member for adjustable elevational movement whereby the contacts are elevationally adjustable, a movable contact pivotally connected to the plate, means operably connecting the movable contact to the forward end portion of the control arm for pivoting the movable contact alternately into engagement with the contacts in response to predetermined elevational movement of the control arm, a hydraulic system including a source of hydraulic fluid under pressure and an electrically controlled reversible valve connected to the ram, and an electric circuit including a source of electrical energy having controlled connection to the switch and controlling connection to the reversible valve, said switch completing an electrical circuit through one of its poles to the valve when the rearward end of the control arm descends relative to the plow to contract the ram and completing an electrical circuit through its opposite pole to the valve when the rearward end of the control arm raises relative to the plow to extend the ram.

3. In combination with a tractor having forward and rearward end portions and an elevationally movable draft hitch at the rearward end thereof which is releasable for free floating movement, a tool having a forwardly disposed point pivotally mounted on the draft hitch for adjustable inclination of its forwardly disposed point, the tool being characterized by a tendency when drawn through the earth to increase its depth of earth engagement when the point is downwardly directed and to decrease its depth of earth engagement when the point is upwardly directed, a control lever rigidly connected to the tool and upwardly extended therefrom adjacent to the draft hitch, a ram pivotally interconnecting the control lever and the draft hitch, an automatic control arm having a forward end portion pivotally mounted on the tool and an opposite end portion rearwardly extended therefrom, means mounted on the extended end of the arm for surface engagement with the earth adjacent to the tool, a single pole double throw switch having controlled connection to the control arm, an hydraulic system including a source of hydraulic fluid under pressure and an electrically controlled reversible valve connected to the ram, and an electric circuit including a source of electrical energy having controlled connection to the switch and controlling connection to the reversible valve, said switch completing an electric circuit to the valve when the wheel rises relative to the tool to actuate the ram to tip the forward end of the tool upwardly and reversing the valve to actuate the ram to tip the forward end of the tool downwardly when the wheel descends relative to the tool.

4. An automatic control system for an earth working tool carried in earth traversing movement by a tractor having a predetermined relative direction of movement and an elevationally movable draft hitch releasable for free floating movement, which tool has a forwardly disposed point and is characterized by a tendency when drawn through the earth to increase its depth of earth engagement when the point is downwardly directed and to decrease its depth of earth engagement when the point is upwardly directed, means mounting the tool rearwardly of the draft hitch for pivotal elevational movement whereby the point of the tool can be tipped upwardly and downwardly, a control lever rigidly connected to the tool and upwardly extended therefrom adjacent to the draft hitch, a two-way ram pivotally interconnecting the control lever and the draft hitch, an automatic control arm having a forward end portion pivotally mounted on the tool and an opposite end portion rearwardly extended therefrom, a wheel mounted on the extended end of the arm for earth engagement adjacent to the tool, a single pole double throw switch having controlled connection to the control arm, an hydraulic system including a source of hydraulic fluid under pressure and an electrically controlled reversible valve connected to the ram, and an electric circuit including a source of electrical energy having controlled connection to the switch and controlling connection to the reversible valve, said switch completing an electric circuit to the valve when the wheel rises relative to the tool to actuate the ram to tip the forward end of the tool upwardly and reversing the valve to actuate the ram to tip the forward end of the tool downwardly when the wheel descends relative to the tool.

5. In combination with a tractor having forward and rearward end portions and an elevationally movable draft hitch at the rearward end thereof which is releasable for free floating movement, a plow having a plow beam pivotally mounted on the draft hitch and rearwardly extended therefrom whereby pivotal movement of the plow beam tips the plow upwardly and downwardly for decreased and increased depth of earth engagement respectively when drawn through the earth, a control arm pivotally mounted on the plow beam and rearwardly extended therefrom, a wheel rotatably mounted on the control arm in rolling earth engagement adjacent to the plow, a switch plate pivotally mounted on the plow beam concentrically of the pivotal mounting of the control arm and forwardly extended therefrom, means mounted on the plow beam engageable with the switch plate for constraining the plate to adjustable pivotal position on the plow beam, a pair of electrical contacts mounted in spaced relation on the plate in substantially equally spaced relation eccentrically forwardly of the pivotal mounting of the plate, a switch blade pivotally mounted on the plate having an end rearwardly extended from its pivotal mounting and a forward end alternately engageable with the contacts, means on the control arm engageable with the rearward end of the blade for delayed pivotal positioning of the blade incident to pivotal movement of the control arm, an over-center spring connected to the switch blade urging the blade into alternate contact engagement, a control lever rigidly mounted on the plow beam and upwardly extended therefrom adjacent to the draft hitch, a two-way ram pivotally interconnecting the control lever and the draft hitch, a hydraulic system including a source of hydraulic fluid under pressure and an electrically controlled reversible valve connected to the ram, and an electrical system including a source of electrical energy interconnecting the valve and the switch blade electrically in series with the alternate contacts engaged by the blade.

References Cited in the file of this patent

UNITED STATES PATENTS

| | | |
|---|---|---|
| 2,070,436 | Kennedy | Feb. 9, 1937 |
| 2,249,413 | Bechtle et al. | July 15, 1941 |
| 2,405,334 | Silver | Aug. 6, 1946 |
| 2,473,655 | Lohn | June 21, 1949 |
| 2,527,840 | Mott | Oct. 31, 1950 |
| 2,567,107 | Gobeil | Sept. 4, 1951 |
| 2,629,306 | Rusconi | Feb. 24, 1953 |

FOREIGN PATENTS

| | | |
|---|---|---|
| 541,436 | Great Britain | Nov. 26, 1941 |